United States Patent

[11] 3,603,661

| [72] | Inventor | Richard Gray Detro<br>Scotia, N.Y. |
|---|---|---|
| [21] | Appl. No. | 766,367 |
| [22] | Filed | Sept. 20, 1968<br>Division of Ser. No. 426,893, Jan. 21, 1965, abandoned |
| [45] | Patented | Sept. 7, 1971 |
| [73] | Assignee | General Electric Company |

[54] VACUUM SEAL
6 Claims, 7 Drawing Figs.

[52] U.S. Cl............................................. 316/17,
29/25.11, 228/56, 313/317, 316/18
[51] Int. Cl........................................................ H01j 9/00
[50] Field of Search............................................ 316/17, 18,
19, 1, 30, 31; 220/2.1, 2.2, 2.3; 29/25.1, 25.11;
313/317; 219/117; 228/56

[56] References Cited
UNITED STATES PATENTS

| 2,053,164 | 9/1936 | Pipkin............................ | 316/19 |
| 2,380,811 | 7/1945 | Walker........................... | 316/18 |
| 2,414,604 | 1/1947 | Newcombe..................... | 173/324 |
| 2,454,572 | 11/1948 | Roovers ......................... | 250/27.5 |
| 2,522,062 | 9/1950 | Roovers ......................... | 316/30 |
| 2,930,933 | 3/1960 | Griffin, Jr. et al............. | 315/39.63 |
| 3,147,053 | 9/1964 | Phelps et al.................... | 316/19 |
| 3,221,970 | 12/1965 | Lockshin........................ | 228/56 |
| 3,333,047 | 7/1967 | Geoffroi......................... | 228/56 X |

*Primary Examiner*—John F. Campbell
*Assistant Examiner*—Robert J. Craig
*Attorneys*—Nathan J. Cornfeld, Frank L. Neuhauser, Oscar B. Waddell, John P. Taylor and Joseph B. Forman ABSTRACT: The disclosure provides a method for evacuating and sealing an apparatus such as, for example, a voltage-tunable magnetron device, by providing a large evacuation aperture with a sealing ball spaced above the aperture by a support member comprising solder material. The support member spaces the seal ball away from the aperture enabling one to adequately evacuate the device. After sufficient evacuation the temperature is raised to melt the support and allow the seal ball to close and seal the aperture. The melting support structure provides the solder to seal the ball to the walls of the aperture.

INVENTOR:
RICHARD G. DETRO,

BY  *Henry T. Olsen*

HIS ATTORNEY.

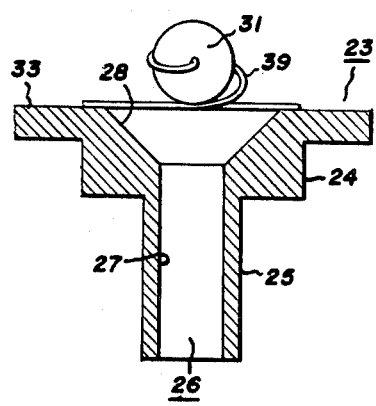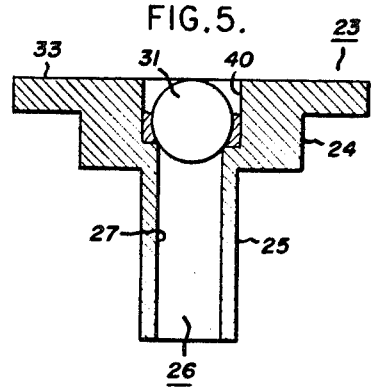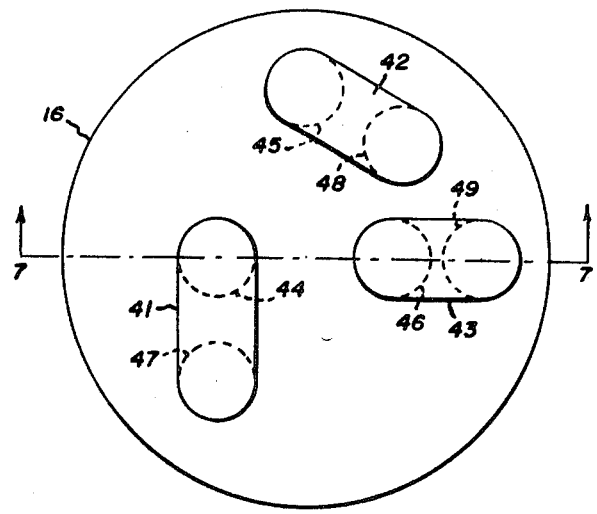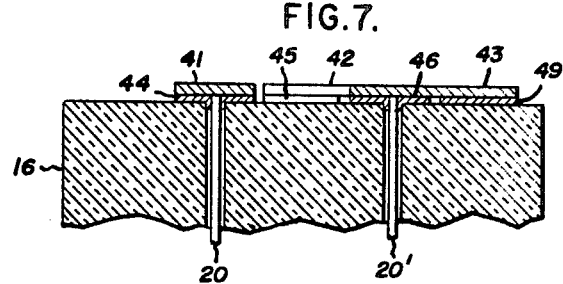

VACUUM SEAL

This application is a division of applicant's copending application Ser. No. 426,893 filed Jan. 21, 1965, now abandoned, and assigned to the same assignee as the present invention.

This invention relates to a vacuum seal construction and method and more particularly, to an improved evacuation seal specifically adaptable to hermetically sealed RF devices, such as for example voltage tunable magnetrons.

The constructional and operational features of a voltages tunable magnetron device are more completely described in U.S. Pat. No. 2,810,096 Peters et al. U.S. Pat. No. 2,930,933 Griffin et al., and U.S. Pat. No. 3,020,445 Weinstein, each of which is assigned to the same assignee as the present invention. Briefly described, a voltage tunable magnetron is referred to in an electrical sense as a crossed field device, and comprises an anode circuit which includes a plurality of axial segments supported in a cylindrical array in mutually spaced side-by-side relationship. This anode circuit has concentrically extending therein a nonemissive electrode or cold cathode. The anode circuit and cold cathode define an evacuated annular interaction region in which electrons emitted from an electron emitter are acted upon by crossed electric and magnetic fields to generate an RF power output.

A voltage tunable magnetron device as described may occupy an overall exterior volume less than about 1 cubic inch, and with respect to the required internal structure, may present a volume to be evacuated of considerably less than 1 cubic inch, one example being about 0.06 cubic inch. Nevertheless, considerably difficulty is encountered in attempting to evacuate this internal volume to a desired or required minimum of 4× $10^{16}$ inches of mercury, particularly because of the restrictive constructional configuration of the parts which combine to limit the flow opening or gas conductance necessary for rapid evacuation to low pressure. Additionally, the precise interfitting and smallness of the parts also limit which parts or space may be utilized in an evacuation process because of the vacuum sealing problem.

Accordingly, it is an object of this invention to provide an improved seal means for evacuated closures.

It is another object of this invention to provide an improved evacuation method.

It is yet another object of this invention to provide an improved self-sealing seal structure.

It is another object of this invention to provide improved sealing means in an electrical discharge device.

It is another object of this invention to provide improved self-sealing means in an RF device.

It is a further object of this invention to provide a self-sealing metallic evacuation seal in a magnetron device.

It is yet another object of this invention to provide a self-sealing ball and seat metallic seal in a voltage tunable magnetron.

Briefly described, this invention is one of its preferred forms includes a hollow funnel-shaped cathode assembly extending into a voltage-tunable magnetron device. A sealing ball is supported in spaced relation above the tapered or funnel portion of the cathode by means of a raised solder metal bridge structure. The magnetron device is placed in a vacuum furnace and evacuated to the required degree of vacuum with relatively unobstructed gas conductance through the hollow funnel member and through the open network of the raised metal bridge. After evacuation, the temperature of the furnace is raised above the melting point of the solder metal bridge which softens and disposes the sealing ball in constricting relationship within the tapered portion of the funnel. The ball is then hermetically sealed to the funnel by means of the molten solder.

This invention will be better understood when taken in connection with the following description and the drawings in which FIG. 1 is a cross-sectional view of one preferred embodiment of this invention with the seal parts in their assembled and preoperative relationship.

FIG. 4 illustrates a coil modification of the metal bridgework of FIG. 1.

FIG. 5 illustrates a modification of the ball seal of this invention.

FIG. 6 is an illustration of tab connector members attached to the magnetron device of FIG. 1.

FIG. 7 is a cross-sectional view of FIG. 6.

Figure 1:
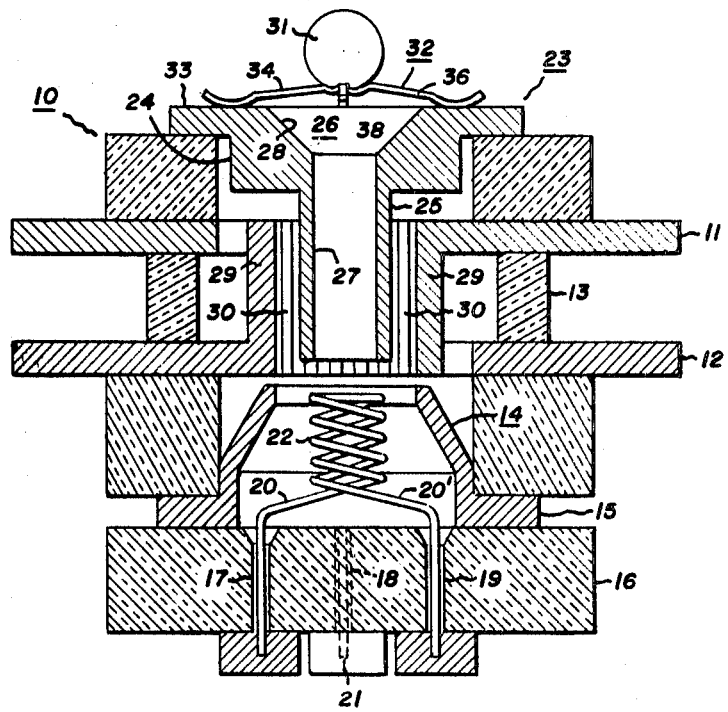

Referring now to FIG. 1, there is illustrated one preferred apparatus to which this invention is most particularly applicable, a voltage tunable magnetron similar to that disclosed and described in U.S. Pat. No. 3,020,445 above mentioned. The magnetron device or tube 10 of FIG. 1 generally includes stacked assembly of alternately arranged and suitably sealed metal and ceramic members wherein some of the metal members serve as electric terminals of the device and the ceramic members serve as insulative spacers between the metal members. The metal members which serve as electrical terminals include a pair of annular anode terminals 11 and 12 separated by a ceramic cylinder 13. The metal members further include an inner frustoconical control electrode 14 having a radially extending flange 15. Abutting flange 15 in sealed relationship thereto is a ceramic disk member 16 which closes off one end of the magneton volume. End member 16 also includes suitable apertures 17, 18 and 19 through which electrical leads 20, 20' and 21 extend. Leads 20, 20' and 21 are connected to a thermionic emissive emitter element 22 and to control electrode 14 respectively.

The other end of the voltage tunable magnetron device is closed off by means of metal end or extension member 23 which comprises a shoulder portion 24 and an axially extending cylindrical cold cathode portion 25. The cathode member 23 is defined as a hollow member having an axial passage or aperture 26 extending therethrough and coaxial therewith. The axial passage 26 includes a generally cylindrical portion 27, and a frustoconical or outwardly tapering portion 28 within the shoulder portion 24 and member 23. The defined axial passage 26 is the gas-conducting passage which is utilized to evacuate the internal volume of the magneton of this invention. Additional passages through the wall of aperture 26 may also be employed if desirable.

Electrodes 11 and 12 define the anode circuit, as previously described, including the cylindrical array of axially extending segments 29. Half of these segments 29 depend from one electrode 11 while the other half are supported by electrode 12, their interleaved position being described as interdigital relationship. The interaction space 30 is defined by the interdigital anode circuit spaced about the nonemissive cathode 25, and electrons from emitter 22 are acted upon in this space.

In one operative form, the sealing means of this invention is practiced after precision assembly of fixed parts of the magnetron tube has taken place. More particularly, the device as illustrated in FIG. 1 is assembled with all parts in their operating and sealed relationship with the exception of the opening into the magnetron device permitted by the axial passage 26. The magnetron device is then evacuated in a vacuum furnace and thereafter sealed with the improved seal of this invention.

As illustrated in FIG. 1, the sealing arrangement of this invention includes a seal ball member 31 supported above member 23 by means of a solder metal bridge or support member 32. The ball 31 which may be manufactured from various materials wettable by a predetermined solder is preferably of a metal such as for example copper. The copper or other material ball may also be plated with a metal such as silver to increase its solder wettable characteristics. Ball 31 includes a diameter which is substantially greater than the neck diameter of cylindrical aperture 26, the ball diameter being dependent on maintaining the ball 31 within the frustoconical aperture 28, and if desirable, so that the ball does not protrude beyond the top surface 33 of member 23. At the same time the ball 31 diameter should be of a reduced size which will permit the ball to be seated at the juncture or neck of the frustoconical aperture 28 of passage 26, and the cylindrical aperture 27 of passage 26.

Figure 2:
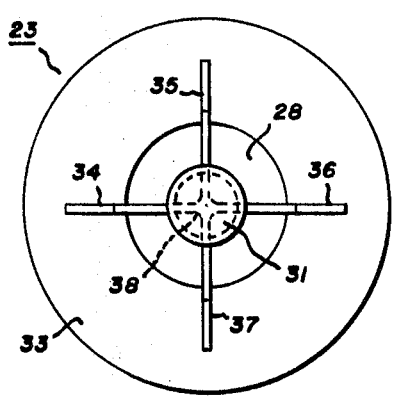
FIG. 2 is a top view of FIG. 1.

Ball 31 is supported above the surface 33 of member 23 by a framework or bridge support member 32 of solder material. This bridge support 32 includes a spider like stamping of solder metal from thin sheet stock to provide a plurality of radially extending legs meeting to provide a central ball support. As better illustrated in FIG. 2, the bridge 32 includes in one form four legs, 34, 35, 36 and 37, radiating outwardly from a center portion 38 which is dimpled to receive ball 31. The height of the ball 31 from the surface 33, and the width of the legs 34 through 37 are so chosen that the gas conductance through or between the legs is at least equal to the gas conductance through the defined aperture 26. It is desirable, however, to have gas conductance through bridge 32 as large as possible to facilitate evacuation. In order to increase gas conductance, aperture 26 which is in cylindrical form, has an effective diameter as large as about 0.070 inches. The magnetron as illustrated in FIG. 1 is placed in a vacuum furnace for evacuation to take place through passage 26. The large diameter of passage 26 taken in connection with the ball seal including a ball supported in spaced relationship from the passage 26 or opening 28 provides a rapid evacuation of the magnetron device to a pressure of about $1\times10^{15}$ millimeters of mercury.

Figure 3:
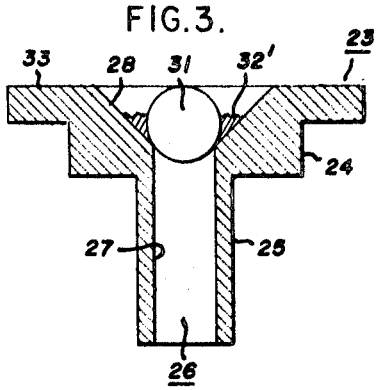
FIG. 3 is an illustration of the FIG. 1 embodiment after heating and with the seal in operative relationship.

At the end of the evacuation cycle the temperature of the vacuum furnace is raised until such time as the solder metal of the bridge 32 softens and permits ball 31 to be positioned or settled to the throat of aperture 26. Continued melting of the solder metal creates a fluid meniscus in contact with the ball 31 which firmly positions ball 31 in aperture 28, and hermetically seals ball 31 to the member 23. The surface tension created in the meniscus is sufficient to firmly seat ball 31 in aperture 28 and no additional force is necessary. Where an enlarged aperture replaces the dimple in the bridge 32, controlled softening of the solder will position the ball in the throat of passage 26 before any substantial amount of molten solder passes through the aperture 26. As illustrated in FIG. 3, ball 31 is retained closely adjacent the walls of aperture 28 and not spaced therefrom by any substantial amount of solder. The solder metal may be so chosen that a desirable elevated temperature may be utilized in the evacuation process before sealing takes place.

In one operative practice of this invention ball 31 was copper of 0.096 inch diameter which was plated with silver of approximately 0.0010 inch thick. Bridge 32 was of a silver-copper solder melting at 790° C. and stamped of a sheet material of about 0.005 inch thickness. The described ball and solder were employed in conjunction with a tampered, frustoconical or funnel aperture 28 tapering 30° to the vertical, and concentrically joining with a cylindrical aperture 26 of 0.70 inch diameter. An exemplary method includes evacuating the tube device in a vacuum furnace at about 500° C. Thereafter when evacuation has reached $1\times10^{17}$ millimeters of mercury in the furnace, the temperature of the furnace is raised to about 700° C. for a short period of time, and thereafter slowly raised to 800° C. The slow raising in about 2 minutes softens the solder of bridge 32 and positions ball 31 in passage 26. Thereafter molten solder flows into aperture 28, fixedly hermetically seals ball 31 in position and solidifies when temperature is reduced.

FIG. 3 is exemplary of the seal of this invention, after the above described process. The amount of solder in bridge 32 is controlled so that no excess solder flows into passage 26 during the described process. As illustrated in FIG. 3, most of the solder 32 is above the contact point between the ball and the wall of aperture 26. At this point the seal is a fixed one as opposed to the adjustable open and closed kind.

In FIG. 4 a support or bridge member 39 is employed which is in the form of a suitable wire or frame which may be coiled to provide a small coil or ring directly over the funnel aperture 28. The small coil having a diameter smaller than ball 31 then supports ball member 31 in desired space relationship. It is obvious that a great number of modifications may be employed to support the ball and in spaced relationship from upper surface 33 of member 23 for effective gas conductance, and then to deposit ball 31 within funnel aperture 28. These modificatons are generally in the form of open network, frame or foraminous members which support ball 91 from surface 33. In all instances the supports are operative to soften and deposit ball 31 in the funnel aperture 28 and to thereafter solder seal ball 31 over the aperture 27. Support 32 may need be only partly of solder so that where softened the remaining bridge structure is caused to tilt and deposit ball 31 in aperture 28.

The ball seal of this invention may also be applied to other forms of openings over which a ball seal may be positioned and sealed. Referring now to FIG. 5, member 23' is provided with a counterbore 40 within the shoulder portion 24. Upon softening of a form of solder bridge as described, ball 31 is deposited in the counterbore in sealed relationship to the aperture 26. The counterbore or other such aperture may be proportioned so that the ball 31 by its own weight and through surface tension of molten solder seats itself in the desired position. It is preferred to have some wall portion tapered on a chamfer to facilitate seating of ball 31.

As can be understood from this invention as described, ball 31 need not be physically supported by a solder metal frame. Ball 31 may be supported by a suitable fixture to drop the ball 31 in aperture 28 at the desired time. However, the ball dropping or positioning process must be related to melting solder. The ball may be dropped in position before solder melting. However, where surface tension of softening or molten solder will not permit flow through passage 26, the ball 31 may be dropped on softening or molten solder. Additionally, a solder metal coated ball may be dropped into a constricting aperture at the appropriate time.

An important advantage of this invention relates to the features that a great number of magnetron tube devices can be assembled and placed in an individual furnace and the evacuation and sealing may take place simultaneously with the large number of magnetron tube devices. This feature represents a decided economic advantage and substantially increased production with no increase in needed equipment. More particularly, however, the invention provides an increase in the evacuation cycle of the magnetron tube, particularly in the evacuation of the internal volume quite rapidly to pressures as low as $1\times10^{15}$ millimeters of mercury. Heretofore, with small gas conductance passage, such low pressures were not obtainable in the magnetron tube device within the time allotted to the evacuation cycle. Additionally, it was not known in the prior practice whether or not the internal pressure of the tube had been reproduced to at least the internal pressure of the vacuum furnace. Representative tests of the tubes evacuated and sealed in accordance with the present invention as compared to tubes evacuated and sealed by prior means indicate increased performance characteristics particularly in the emitting characteristics of the tubes. These and other operating characteristics tend to indicate that prior evacuation practices did not reduce the pressure within the tube to or nearly the same pressure as within the vacuum furnace.

A further advantage of this evacuation and sealing invention is that it obviates attempts to evacuate the structure between precisely fitting parts such as for example between member 23 and ceramic washer 16. A slight angularity at this point seriously affects magnetron operation. At the same time this and other prior procedures require extreme accuracy jigs for positioning various parts during sealing.

The problem of evacuation of a magneton tube device does not end with the sealing of the tube as described. In many instances the reject rate in production of these magnetron tube devices is high because of leaks developing through connections made to the tube. For example, referring again to FIG. 1, there is illustrated a partial bottom view of a magnetron tube device illustrating button-type electrical connectors 41, 42 and 43 utilized in making required electrical connections to the tube. In the assembly of the magnetron tube package a suitable electrical connector is spotwelded to each of these buttons. This spotwelding subjects these buttons to a high degree of concentrated heating which in many instances destroys the metallizing and seal between the button and the ceramic end member 16. When this occurs, gas leaks into the tube and the tube is rendered defective. It has been discovered that by removing the buttons and replacing them with tab members, the mentioned difficulty may be obviated.

Referring now to FIG. 6 there is illustrated there thin shims or tabs of metal 41, 42 and 43 which are utilized in place of the described buttons. In practice the bottom surface of ceramic member or base plate 16 is provided, as in FIG. 1, with the leads 17, 18 and 19 fitting in their respective openings. The leads are fixed to the wall of the respective opening by metallizing the walls and then utilizing a solder metal to solder the leads to the metallizing. Alternately, the leads may be directly brazed to the ceramic member 16 by means of a suitable braze. One preferred metallizing mixture includes molybdenum-manganese or these plus other metals. Preferred examples are disclosed in U.S. Pat. Nos. 2,667,427 Nolte; 2,667,432 Nolte, and 3,023,492 Bristow, each of which is assigned to the same assignee as the present invention. The metallized areas 44, 45 and 46 are clearly illustrated in FIGS. 6 and 7.

Spaced from each metallized area are further predetermined areas 47, 48 and 49, which are similar in material to areas 44, 45 46, and arranged so that each is generally equidistant from a counterpart area 44, 45 or 46. These areas, however, may be extensions of areas 44, 45 and 46, and may be suitable braze compositions attached directly to ceramic 16. Bridging each pair of metal areas such as 44 and 47, 46 and 49, 45 and 48, is a tab of thin sheet metal such as for example 0.015 inch thick tantalum, monel, etc. Where the mentioned areas are of a metallizing material, a suitable solder is employed to join a tab to the metallizing surface.

FIG. 7 is an exaggerated view of a cross section of FIG. 6 for the purpose of showing the metallized or braze areas. It should be understood, however, that in practice the tab members may be substantially flush with member 16 and the metallizing or braze surface may be a single radially extending layer. The tab members 41, 42 and 43 serve an important purpose in attaching the magnetron device 10 to further electrical leads or connectors. These connectors may be spotwelded to tabs 41, 42 and 43 at a point spaced from sealed leads 17, 18 and 19. Because of the distance involved and the heat radiating capacity of the tabs, high heat and stress concentration at the leads 17, 18 or 19 is minimized and resultant seal damage and leakage is also minimized. The tab members as described may take various forms, including curved, angular, etc., both in the surface plane of member 16 and perpendicular thereto. As an added example, these tab members may extend radially outwardly beyond the periphery of member 16.

While this invention has been described with reference to particular and exemplary embodiments thereof, it is to be understood that numerous changes can be made by those skilled in the art without actually departing from the invention as disclosed, and it is intended that the appended claim include all such equivalent variations as come within the true spirit and scope of the foregoing disclosure.

What is claimed and desired to be secured by Letters Patent of the United States is:

1. A method of sealing an apparatus having a constricting aperture therein through which said apparatus is evacuated comprising in combination,
   a. placing an open framework containing a solder material over said aperture,
   b. positioning a plug member on said frame in spaced relationship from said aperture,
   c. placing said apparatus in a vacuum furnace and evacuating said apparatus to a predetermined vacuum,
   d. raising the temperature of said furnace sufficient to melt said solder with the result that said plug member is positioned in the constricting aperture in sealed relationship therewith.

2. A method of sealing an evacuated apparatus having a tapered aperture therein for the evacuation of said apparatus therethrough comprising in combination,
   a. placing an open framework of a solder metal over said aperture in spaced relation thereabove,
   b. supporting a seal ball on said framework spaced from said aperture,
   c. placing said apparatus in a vacuum furnace and evacuating said apparatus through said aperture to a predetermined vacuum,
   d. raising the temperature of said furnace sufficient to soften said solder framework to position said ball in said aperture so that said solder provides a hermetic seal therewith.

3. The invention as recited in claim 2 wherein said framework is a spider member having a central portion and a plurality of radially extending legs extending therefrom.

4. The invention as recited in claim 2 wherein said framework comprises a spiral support.

5. In a voltage tunable magnetron having a restricting aperture extending therein through a cold cathode, a method of evacuating and sealing said magnetron comprising,
   a. positioning said magnetron in a vacuum furnace,
   b. placing a support of solder metal over said aperture and spaced thereabove,
   c. a placing a copper containing ball having a silver containing coating on said support to be supported thereby above said aperture,
   d. evacuating said magnetron to a desired pressure,
   e. raising the temperature of said furnace so that said support softens and deposits said ball in said restricting aperture and said solder flows thereabout to provide a hermetic seal.

6. A method of sealing an apparatus having a constricting aperture therein through which said apparatus is evacuated comprising in combination:
   a. placing an open framework comprising a solder material over said aperture;
   b. positioning a seal ball on said framework a sufficient distance from said aperture to define a passageway through said framework having a gas conductance at least equal to the gas conductance through said aperture;
   c. placing said apparatus in a vacuum furnace and evacuating said apparatus to a predetermined vacuum; and
   d. raising the temperature of said furnace sufficient to melt said solder with the result that said ball is positioned in the constricting aperture in sealed relationship therewith.